March 1, 1932.  A. D. FERGUSON  1,847,175
ELECTRIC TRACTION CONTROL SYSTEM
Filed Aug. 30, 1929   3 Sheets-Sheet 1

INVENTOR
Alexander D. Ferguson
BY
ATTORNEY

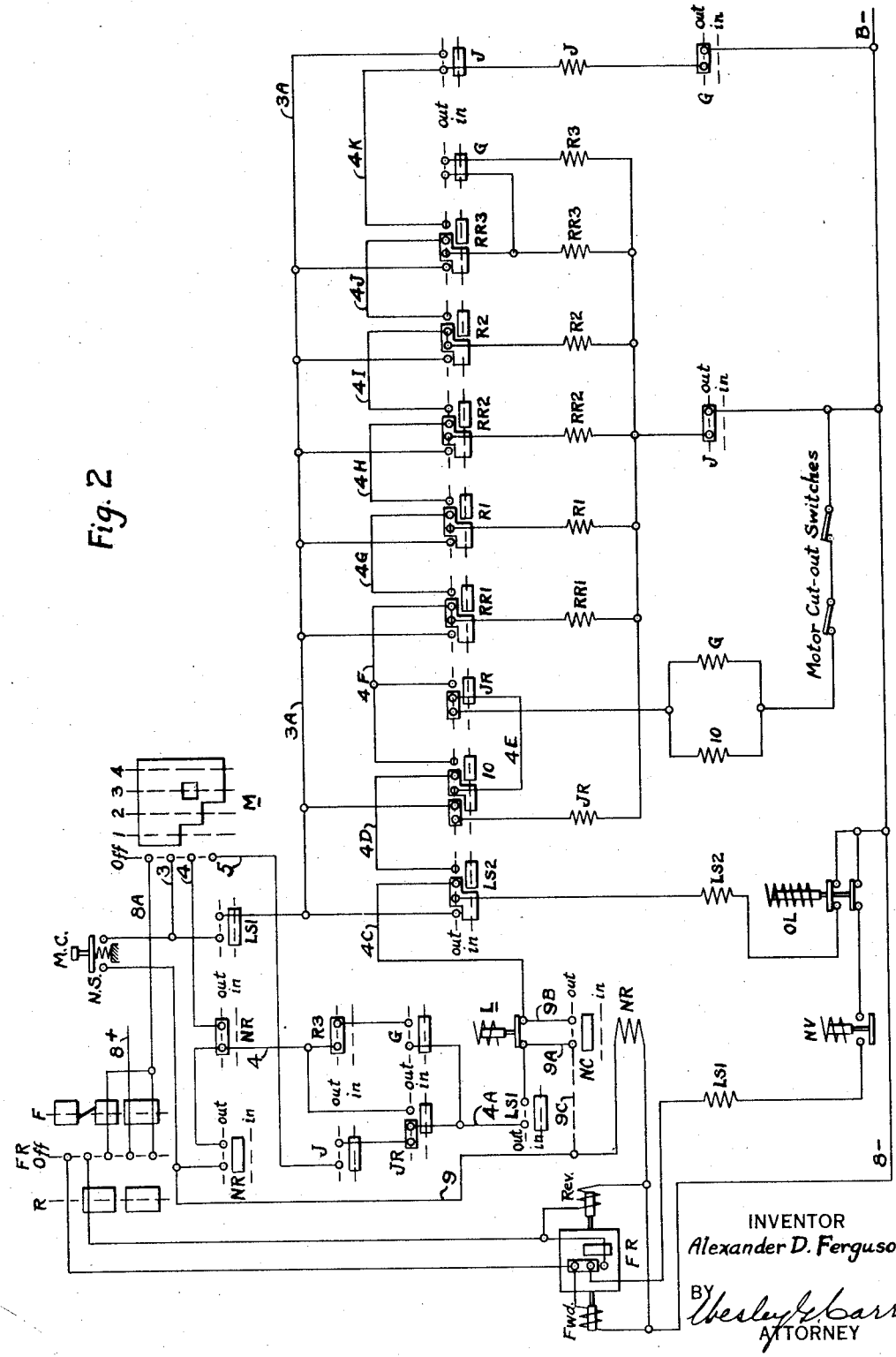

March 1, 1932.   A. D. FERGUSON   1,847,175

ELECTRIC TRACTION CONTROL SYSTEM

Filed Aug. 30, 1929   3 Sheets-Sheet 3

Fig. 3   Switches

| Con. Pos. | Sequence | LS1 | LS2 | R1 | R2 | R3 | RR1 | RR2 | RR3 | J | JR | 10 | G |
|---|---|---|---|---|---|---|---|---|---|---|---|---|---|
| 1 | Ser. 1 | O |  |  |  |  |  |  |  |  | O |  |  |
| 2 | 2 | O | O |  |  |  |  |  |  |  | O |  |  |
|  | 3 | O | O |  |  |  | O |  |  |  | O |  |  |
|  | 4 | O | O | O |  |  | O |  |  |  | O |  |  |
|  | 5 | O | O | O |  |  | O | O |  |  | O |  |  |
|  | 6 | O | O | O | O |  | O | O |  |  | O |  |  |
|  | 7 | O | O | O | O |  | O | O | O |  | O |  |  |
|  | 8 | O | O | O | O |  | O | O | O | O |  |  |  |
| 3 | Transition 1 | O | O |  |  |  |  |  |  |  | O |  |  |
|  | " 2 | O | O |  |  |  |  |  |  |  | O | O | O |
|  | Par. 9 | O | O |  |  |  |  |  |  |  |  | O | O |
| 4 | 10 | O | O | O |  |  | O |  |  |  |  | O | O |
|  | 11 | O | O | O | O |  | O | O |  |  |  | O | O |
|  | 12 | O | O | O | O | O | O | O | O |  |  | O | O |

INVENTOR
Alexander D. Ferguson
BY
ATTORNEY

Patented Mar. 1, 1932

1,847,175

UNITED STATES PATENT OFFICE

ALEXANDER DOLGETY FERGUSON, OF ASHTON ON MERSEY, ENGLAND, ASSIGNOR TO WESTINGHOUSE ELECTRIC & MANUFACTURING COMPANY, A CORPORATION OF PENNSYLVANIA

ELECTRIC TRACTION CONTROL SYSTEM

Application filed August 30, 1929, Serial No. 389,364, and in Great Britain September 21, 1928.

This invention relates to electric traction and like motor control systems of the type in which acceleration of the motors, for example, by cutting out series resistance, and by series-parallel control is obtainable automatically by means of a system of electrically actuated or governed switches or contactors which are caused to operate in proper sequence under the control of interlock switches, the operation of the contactors being also controlled in accordance with the armature current of the motors by means of a current limit relay so that acceleration is prevented until the armature current falls to a predetermined value.

In such a system correct operation is dependent upon the accurate proportioning of the times of operation of the various contactors and of the current limit relay. If starting is held up by reason of some severe condition of track or gradient, acceleration may be effected non-automatically by temporarily short-circuiting the contacts of the current limit relay by means of a hand switch which may be closed by the attendant. In the arrangements heretofore proposed the time during which such short-circuiting switch may be closed depends upon the personal element and the proper proportioning of the times of operation of the various contactors of the automatic system and cannot therefore be relied upon.

According to the present invention the short-circuiting or by-passing of the current limit relay is effected by an electrically actuated or governed time lag relay, of the reciprocating type, which closes its contacts both when actuated and during its return movement and which is adapted when actuated by operation of the driver's hand switch, to provide a single impulse of current in the actuating circuit of just sufficient duration to advance the acceleration a single notch only, unless the hand switch is again operated. For this purpose the impulse current transmitted by the notching relay to the actuating circuit is preferably derived from the main source as the current which controls the operation of the notching relay. For instance, in a convenient arrangement, the closure of the hand switch may energize the solenoid which controls the valve governing the admission of air to a pneumatic cylinder, which during its full movement in one direction closes, and after the predetermined interval of time, opens again the circuit which by-passes or short-circuits the contacts of the current limit relay, the solenoid and the by-passing or short-circuiting circuit being both energized through the hand switch when closed. Therefore when the hand switch is released and the notching relay closes its contacts again during its return movement, a second impulse of current is not transmitted, the supply being interrupted by the hand switch. It will be appreciated that the duration of the impulse obtained from the notching relay is dependent, apart from previous adjustment, upon the pressure of the air supply. However, in the case of pneumatically actuated contactor switches, the speed of operation of the latter will vary in like manner with the air pressure.

The notching relay conveniently comprises the usual pneumatic piston and cylinder and electrically controlled air valve of a contactor, the piston, however, carrying a contact segment or plate which, during reciprocation is engaged by fixed contact fingers for a time depending, apart from the air pressure, upon the width of the contact plate.

According to a further feature of the invention means are provided whereby a notching relay may be used to effect full hand acceleration in the event of the failure of the automatic accelerating relay. For this purpose, the reverse drum of the main controller may be provided with an additional position both for forward and reverse running, additional contact segments being also provided on the main acceleration drum, the extra positions on the reverse drum effecting change of control connections as between automatic and hand acceleration, whilst the extra segments on the main control drum in effect replace the hand switch by means of which the notching relay is energized to give an impulse current in the manner above set forth. With this arrangement, when the reverse drum is set at either of the extra positions, that is, the positions appropriate for hand acceleration, the notching relay may be operated by moving the main drum from the first notch to the next, one of the extra contact segments on this drum closing the circuit of the valve solenoid on the notching relay to give an impulse of current to the actuating circuit. To reach the next notch the main drum of the controller is moved back to the first position, an operation equivalent to releasing the hand switch previously referred to, and is then moved on to the second notch again, once more energizing the governing coil of the notching relay, and so on until full series running is obtained. When series-parallel control is provided, further acceleration may be obtained by moving the main drum to the first series parallel position so that another of the additional contacts on this drum becomes effective in the manner previously described, resistance being cut out with the motors connected in parallel by notching backwards and forwards between the first and second parallel positions on the controller.

To enable the invention to be clearly understood it will now be described by way of example with reference to the accompanying drawings in which:

Fig. 2 is a control circuit schematic of one suitable control system for the equipment illustrated in Fig. 1, the diagram of Fig. 2 being a conventional form preferred and understood by electric traction engineers.

Fig. 3 is a chart, also in conventional form, showing which main circuit switches are closed on the different notches of the master controller.

Figure 1:
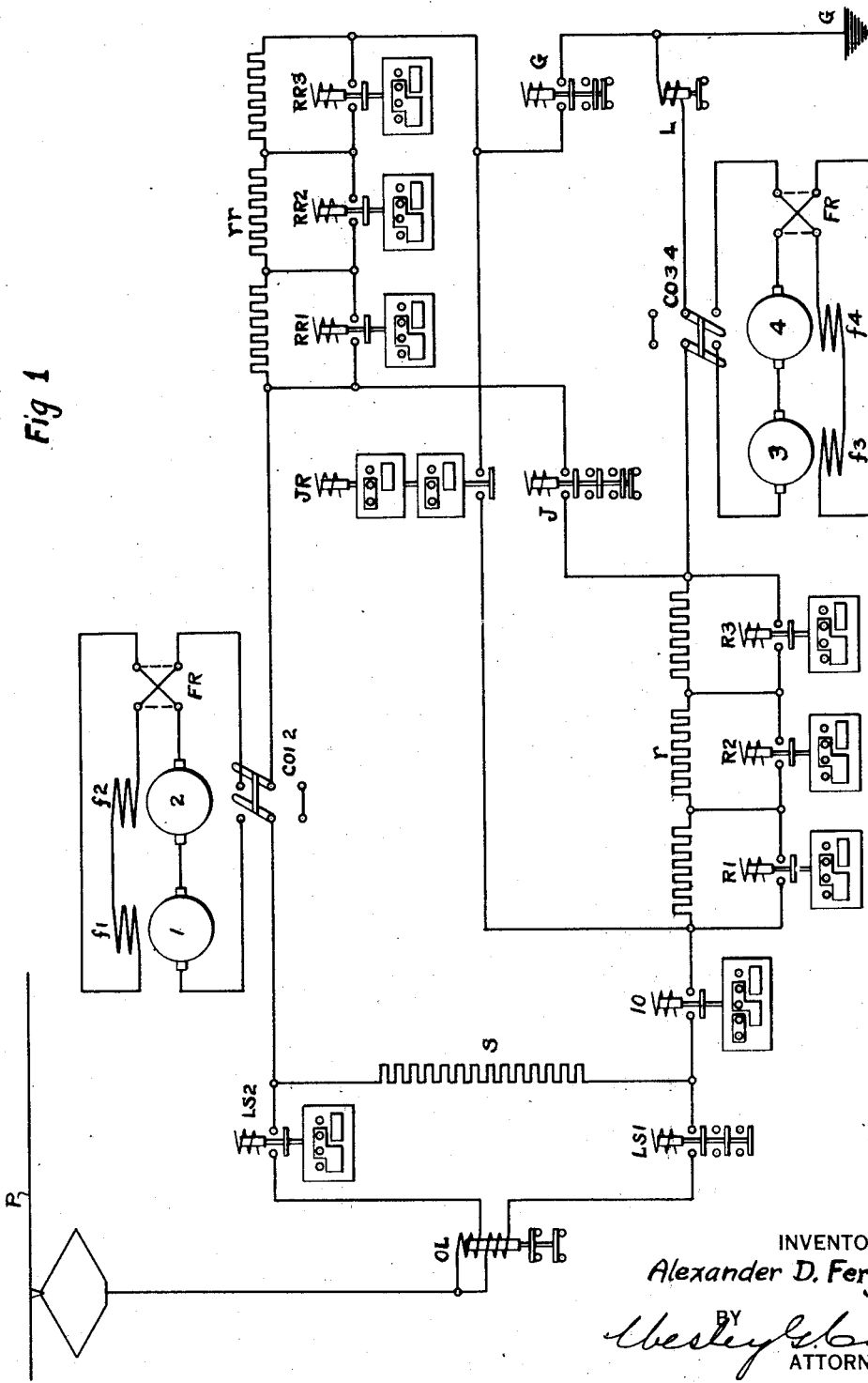
Figure 1 is a schematic or greatly simplified main circuit diagram of an electric traction motor equipment.

Referring first to Fig. 1 of the drawings the trolley or pantograph and the ground supply conductors are indicated respectively at P and G. There are in this instance two pairs of electric motors the armature of which are indicated at 1, 2 and 3, 4 by circles, whilst the respective field windings are indicated at $f1$, $f2$ and $f3$, $f4$. Two line switches LS1 and LS2 are used. Two speed controlling resistance banks are shown at $r$ and $rr$, these resistances being sectionalized and provided with the usual short-circuiting switches R1, R2 and R3 and RR1, RR2 and RR3, the suffix numerals indicating the order in which these switches close during acceleration. FR are reverser switches for the field windings $f1$ to $f4$ to permit running in both directions in the usual manner.

Switches J, JR, C and 10 are switches permitting series-parallel control of the pairs of motors in the well known manner.

Switches indicated CO1—2 and CO3—4 enable either pair of motors to be cut out in case of fault. S is a resistance used initially in starting, L is the coil of the limit switch and OL are the coils of the usual overload relays.

Referring now to Fig. 2, the control system therein illustrated provides automatic acceleration, under the control of the main drum M of the master controller MC, by the use of the electrically governed pneumatically actuated switches or "contactors" which are caused to operate in proper sequence by reason of interlock switch contacts provided on said contactors, the progress of acceleration being also controlled by the limit switch L in the manner hereinafter described in detail. The reverser drum of the master controller is indicated at FR.

In Fig. 2, the various circuits, switches, switch-operating coils and other devices are shown in conventional form and have systematically used reference letters, numerals, and affixes or suffixes corresponding with the reference characters used for the switches shown in Fig. 1. The two positions of the auxiliary or interlock contacts of a switch are indicated by parallel dotted lines given respective reference characters "in" and "out" corresponding to the positions which said contacts occupy when the corresponding contactor switch is closed and open respectively. In the case of the reverser switches FR the positions of the interlock contacts are correspondingly indicated "For" and "Rev".

The control circuits are all energized from a suitable source through positive and negative supply wires 8+ and 8—, the wire 8+ being only connected when the reverser drum FR is in one or other of its two operative positions and passing as the wire 8A to energize the accelerating or "progression" circuits through the main drum M of the controller. Thus when the reverser drum is moved from the "off" position one or other of the switch operating coils "For" or "Rev" will be directly energized to connect the field windings $f1$—$f4$ for forward or reverse running by the reverser switches FR. At the same time one or other of the interlock contacts on the reverser switches FR will positively energize a control wire $fa$ which will energize the closing coil LS1 of the line switch LS1, the circuit of this coil passing through contacts of the usual overload relay OL and no-volt relay NV.

When the main drum M of the master controller is moved to the first notch the wire 3 is energized from the wire 8A through the drum segment. The wire 3 is adapted to be connected to a wire 3A through the "in" interlock contact of the line switch LS1, the latter being closed. The wire 3A is in turn connected to the operating coil of the switch JR by one of the "out" interlock contacts of the switch 10 which is at this time open, the coil JR being connected in turn to a wire 8B which is at this time connected to the negative supply wire 8— through the "out" interlock contact J of the switch J which is open. The switch JR is thus caused to close so that the motors are energized in series with all the starting resistances r and rr and the resistance S in circuit.

If now the controller drum M be moved to the second notch the wire 4 will become energized through a normally closed "out" interlock NR to be hereinafter described, and acceleration, with the motors in series, will proceed automatically as will now be explained. The wire 4 has already been connected to a "progression" wire 4A by the "in" interlock of the switch JR and the wire 4A has been connected to the wire 4B by the "in" interlock of the line switch LS1. The wire 4B will be connected to the wire 4C by the limit switch L if the current through the motors does not exceed the predetermined value. Thus the closing coil LS2 of the other line switch LS2 becomes energized first through the "out" interlock of the line switch LS2 and through another pair of contacts of the overload relay. The line switch LS2 being closed its "in" interlock connects the wire 3A to the coil LS2 and disconnects the wire 4C therefrom, the wire 3A already having been connected to the wire 3 by the "in" interlock of the line switch LS1. Both of the line switches are thus now closed, and the resistance S is short-circuited. By the closure of the line switch LS2 the wire 4D becomes energized from the wire 4C and the wire 4D is connected to a wire 4E through an "out" interlock on the switch 10 which is at this time open and the wire 4E is connected to a wire 4F through another "in" interlock of the switch JR. The wire 4F is normally connected through an "out" interlock on the switch RR1 to the closing coil of this switch. The coil of the switch RR1 is thus energized and the resistance step RR1 is therefore cut out and the motor current increases sufficiently to open the limit switch L. The closure of the switch RR1, by its "in" interlock, connects the coil RR1 to the positively energized wire 3A and disconnects it from the "progression" wire 4F. By an "in" interlock on the switch RR1 the wire 4G is connected to the wire 4F so that when the motor current falls sufficiently the coil R1 of the resistance switch R1 becomes next energized to cut out another resistance step if the motor current is not too high, the coil R1 being connected to the positive wire 3A. Similarly switches RR2, R2 and RR3 close in the order named by the progressive energization of the wires 4H, 4I and 4J through the "in" interlocks of the respective switches closing beforehand. The coil R3, however, is not energized since its connection in parallel with the coil RR3 depends on the closure of the switch G which at this time is open. Finally the coil J becomes energized through the "progression" wire 4K and through an "out" interlock on the switch G to the negative wire 8—. When the switch J closes the previously mentioned "out" interlock J opens to disconnect the wire 8B from the wire 8— so that the switches JR, R1, R2, RR1, RR2 and RR3 all open. The energization of the coil J is transferred from the wire J1 to the wire 3A by means of an "in" interlock of the switch J. Transition between series and parallel operation of the pairs of motors has thus commenced, and continues in the following manner, assuming the drum M has been moved at least as far as the third notch.

The opening of the switch JR causes the coils 10 and G to be connected to the progression wire 4E and thus to close the switches 10 and G. The interlock on the switch 10 connects the wire 4E to the positive wire 3A and interlocks on the switches JR and J connect the progression wire 4A to the wire 5. Upon the closure of the switch G the wire 4A is connected, through the "out" interlock of the resistance switch R3, to the wire 4. The closure of the switch G also opens the energizing circuit of the coil J so that the switch J opens, and transition is completed. If the drum M is on the third notch the wire 4 will be de-energized and the wire 5 is energized but the wire 4A is not energized at this time by reason of the J "out" interlock in the wire 5. However, when the drum M is moved to or beyond the fourth notch the wire 4 becomes again energized and consequently the progression wire 4A becomes energized to excite the coil RR1, and the consequent closure of the resistance switch RR1 results in the energization of the coil R1. The switches RR1 and R1 close substantially simultaneously by reason of the fact that the coil L of the limit switch is in the circuit of only one pair of motors. The closure of the switches RR1 and R1 results in the coils of these switches being connected directly to the positively energized wire 3A. By a similar process the switches RR2 and R2 are caused to close and thereafter the switches RR3 and R3 close, the coil R3 being connected in parallel with the RR3 by the "in" interlock of the switch G.

A particular automatic traction motor control system having been above described by way of example it will now be readily appreciated that under certain conditions of track or gradient the motor current may sometimes be well within the setting of the overload relays and yet too high to permit automatic acceleration to proceed under the desired conditions. To enable acceleration to proceed, the present invention provides the time lag notching relay NR the coil of which is energized through the wire 9 by a hand-operating notching switch NS which may be located on or near the master controller MC. One moving contact NC of the notching relay is adapted, when the switch NS is held closed, to bridge the contacts of the limit switch L through the wires 9A and 9B for a predetermined interval of time which may vary only within the small limits. Thus if the relay NR is electrically controlled and pneumatically actuated, the time the contacts of the notching relay are bridged will in fact vary with the air pressure, but this will be of no consequence if the switches shown in Fig. 1 are also pneumatically actuated from the same supply of compressed air as would ordinarily be the case. The contacts of the limit switch are bridged by the notching relay just for sufficient time for the acceleration to be advanced one notch only. In order to prevent the acceleration from being advanced another notch when the contact returns upon release of the hand switch NS, the previously mentioned "out" interlock on the notching relay NR is provided in the wire 4 and, further, in order that the progression wire 4A may remain energized during the operation of the notching relay the latter is provided with an auxiliary contact which is similar to the main contact and which is adapted temporarily to energize the wire 4 from the wire 9. When, however, the switch NS is released the wire 4 will not be energized from the wire 9 during the return movement of the notching relay so that the acceleration will not be advanced another step non-automatically until the switch NS is again depressed.

Figure 4:
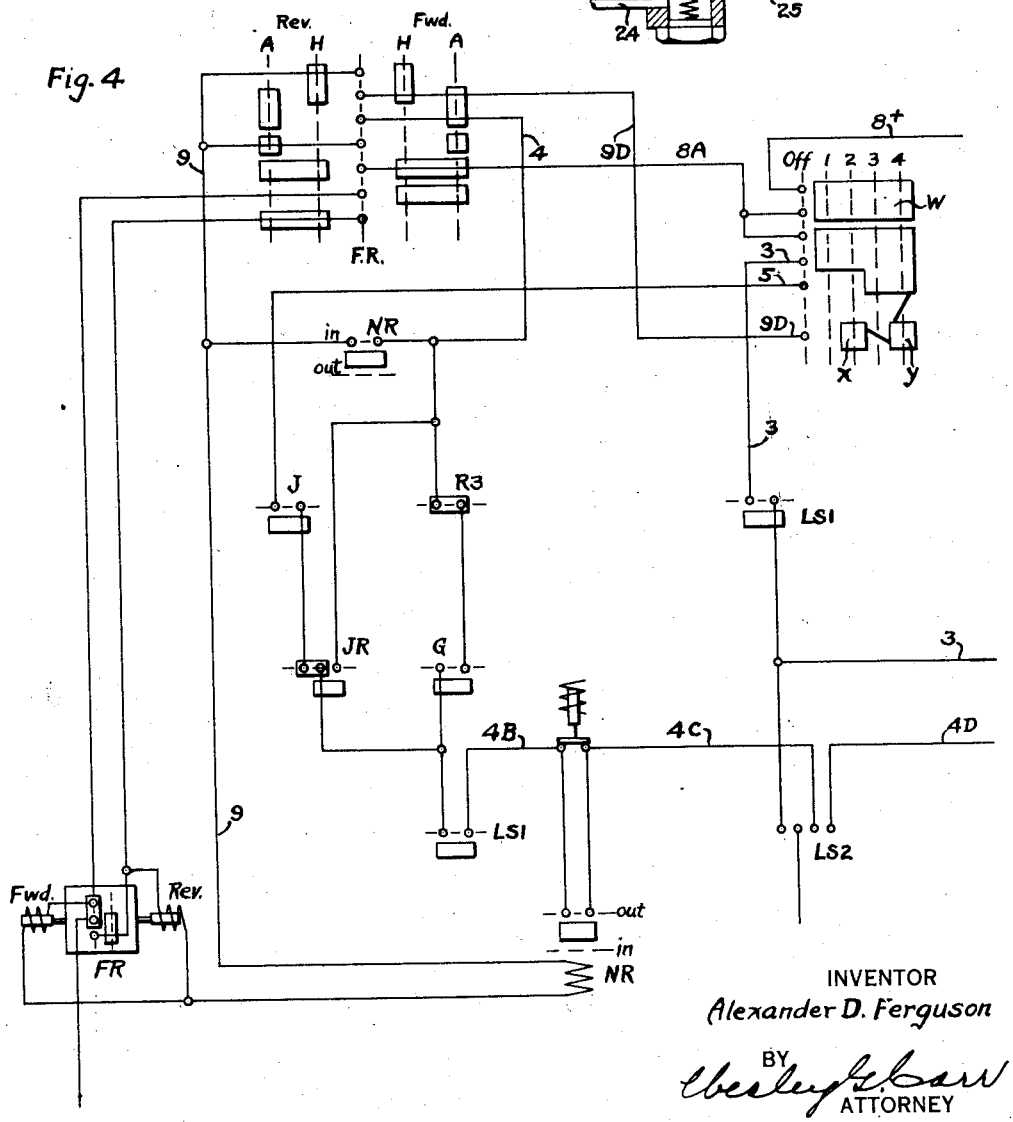
Fig. 4 is a part of a control circuit schematic generally similar to that of Fig. 2 but showing a modified arrangement for effecting hand notching.

Referring to Fig. 4 in the further modification therein illustrated, the hand notching switch NS shown in Fig. 2 is dispensed with and extra notches are provided on the reverse drum FR in combination with extra contact segments on the main drum M whereby hand notching may be obtained by oscillating the main drum between predetermined notches. Thus the reverser drum FR is provided with four notches, namely, H and A for forward running, and A and H for reverse running. In the example illustrated the positive control wire 8+ is switched in by the segment W of the main drum M which furthermore is provided with the additional segments X and Y which connect with the wire 9D on the second, and fourth notches of the drum, an additional notch being necessary in the arrangement now being described. The wire 9D is connected to the wire 9 by the reverser drum, FR in any of its positions. The wire 4 is not taken direct to the main drum M but is adapted to be connected to the wire 9D by the reverser drum only when the latter is set for automatic operation. The wires 4 and 9 are adapted to be connected together momentarily by an auxiliary contact NR of the notching relay when the latter is operated. The remainder of the circuits shown in Fig. 4 are otherwise identical with those shown in Fig. 2.

If the reverser drum is set on either of the notches A, automatic acceleration can be obtained in the manner described with respect to Fig. 2, the wire 4 being energized from the wire 9D by the contacts X and Y of the main drum M.

If the reverser drum is set on either of the notches H and the main drum is moved from the first to the second notch the contact X effects the actuation of the notching relay NR to produce one accelerating notch as by closing the hand switch NS shown in Fig. 2. To produce the next accelerating notch the main drum is moved back to its first notch, an operation which is equivalent to releasing the hand switch NS of Fig. 2. The main drum may now be moved back to the second notch again to produce a further accelerating notch, and so on until full series connection is obtained. Afterwards the main drum may be moved to its third notch next to its fourth notch and then oscillated between its third and fourth notches until full parallel connection with full field strength is obtained.

The invention is applicable in systems in which acceleration is obtained automatically by means of a sequence switch instead of by means of interlocks. Thus in the automatic systems such as described in the specifications of British Letters Patents Nos. 208,334 and 209,243 the hand notching means therein specifically described may be replaced by the notching relay system which has been above described.

Figure 5:
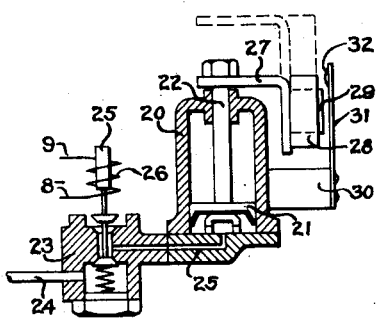
Fig. 5 is a diagrammatic sectional view of a convenient form of notching relay which may be used for effecting the hand notching in accordance with the invention.

Referring finally to Fig. 5, the notching relay therein illustrated comprises an electrically governed pneumatic unit which may be of standard construction such as used for the so-called unit switches employed for some or all of the main circuit switches for instance shown in Fig. 1. The pneumatic cylinder is indicated at 20, the piston at 21 with the piston rod 22 extending above the upper end of the cylinder 20. The pneumatic valve is shown at 23, normally closing the supply pipe 24 from air duct 25. The valve 23 has attached to it or forms part of a solenoid plunger 25' located in a solenoid diagrammatically shown at 26. The terminals of the solenoid 26 are adapted to be connected to the wires 9 and 8−. It will be readily understood that when the valve 23 is in the position shown, the lower side of the piston 21 is opened to atmosphere and the compressed air supply is shut off. If the solenoid 26 becomes energized the valve 23 moves downwards to shut off the lower side of the piston 21 from the atmosphere and to connect it to the compressed air supply causing said piston to travel upwards to its full extent. An adjustable spring or other device (not shown) may be added to retard the motion of the piston.

The piston rod 22 carries a bracket 27 upon which is secured a block or plate 28 of insulating material, upon which, in turn, are secured one or more contact plates 29 located in a plane which is parallel with the axis of the piston rod 22. An insulating bracket 30 is rigidly mounted upon the relay structure, the said bracket having secured to it one or more pairs or resilient contact fingers 31 which are parallel with one another and located substantially in a plane which is parallel with the plane containing the moving contact or contacts 29. The resilient fingers 31 carry contact members 32 which are adapted to be engaged by the contact or contacts 29 when the piston 21 is caused to move up, the arrangement being such that the contacts 32 are not engaged by the contact or contacts 29 when the piston 21 is at either end of its travel.

Although an electrically governed pneumatically actuated relay has been described it will be understood that other forms of time lag relay of the reciprocating type may be used, such for instance as a relay of the solenoid type having a dashpot or other time lag device. In any case means may be provided for adjusting time of operation of the relay in accordance with requirements.

It will be understood that various modifications may be made in connections of the relay and that the invention is not limited in its application to the particular circuits herein described and referred to.

I claim as my invention:

1. In a motor-control system, in combination, a motor, a controller, a plurality of accelerating relays for accelerating the motor step by step in response to actuation of the controller, a current-limit relay disposed to receive the motor currents for controlling the successive operation of the accelerating relays, an auxiliary time-limit relay for shunting the said current-limit relay to establish a circuit for one of the accelerating relays to accelerate the motor by one step, regardless of the position of the current-limit relay and manually-operable means for controlling the operation of the auxiliary relay to effect successive operation of the accelerating relays, regardless of the position of the current-limit relay.

2. In a motor-control system, in combination, a motor, a controller, means for automatically accelerating the motor step by step in response to the actuation of the controller, a limit relay disposed to receive the motor currents for controlling the rate of acceleration of the motor, a time-limit relay disposed to shunt said limit relay to provide for the acceleration of the motor step by step during a predetermined time interval independently of said limit relay, and a manually-operable switch cooperative with said shunting relay for controlling the acceleration of the motor, said shunting relay being disposed to limit the acceleration of the motor to one step for each operation of said manually-operable switch provided for controlling the motor acceleration.

In testimony whereof, I have hereunto subscribed my name this twelfth day of August, 1929.

ALEXANDER DOLGETY FERGUSON.